(12) United States Patent
Sashida

(10) Patent No.: US 12,626,348 B2
(45) Date of Patent: May 12, 2026

(54) ANALYSIS APPARATUS, INSPECTION SYSTEM, AND LEARNING APPARATUS

(71) Applicant: KONICA MINOLTA, INC., Tokyo (JP)

(72) Inventor: Takehiko Sashida, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 374 days.

(21) Appl. No.: 18/252,599

(22) PCT Filed: Nov. 18, 2021

(86) PCT No.: PCT/JP2021/042388
§ 371 (c)(1),
(2) Date: May 11, 2023

(87) PCT Pub. No.: WO2022/113867
PCT Pub. Date: Jun. 2, 2022

(65) Prior Publication Data
US 2024/0005473 A1      Jan. 4, 2024

(30) Foreign Application Priority Data

Nov. 30, 2020    (JP) ................................. 2020-198500

(51) Int. Cl.
*G06T 7/00*        (2017.01)
*G06T 7/11*        (2017.01)
(52) U.S. Cl.
CPC .............. *G06T 7/0004* (2013.01); *G06T 7/11* (2017.01); *G06T 2207/30156* (2013.01)

(58) Field of Classification Search
CPC ..................... G06T 7/0004; G06T 7/11; G06T 2207/30156; G01N 2021/845; G01N 21/8806; G01N 21/8851; G06V 2201/06
See application file for complete search history.

(56) References Cited

U.S. PATENT DOCUMENTS

| | | | |
|---|---|---|---|
| 7,873,219 B2 * | 1/2011 | Friedhoff ............. | G06V 10/457 382/199 |
| 12,416,552 B2 * | 9/2025 | Ishitsuka .................. | G01N 1/08 |

(Continued)

FOREIGN PATENT DOCUMENTS

| | | |
|---|---|---|
| CN | 106662537 A | 5/2017 |
| CN | 107462580 A | 12/2017 |

(Continued)

OTHER PUBLICATIONS

International Search Report issued in corresponding International Application No. PCT/JP2021/042388 mailed Feb. 1, 2022 (5 page).

(Continued)

*Primary Examiner* — Bobbak Safaipour
(74) *Attorney, Agent, or Firm* — Osha Bergman Watanabe & Burton LLP

(57) ABSTRACT

An analysis apparatus includes: a hardware processor that: acquires image information items of a plurality of images regarding a target that are captured while the target is irradiated with light, extracts, based on the image information items, an image in which an irradiation region where the target is irradiated with the light and an inspection target region of the target have a predetermined relationship, from among the images, and analyzes a state of the inspection target region based on each of the image information items of the extracted image.

15 Claims, 7 Drawing Sheets

(56) References Cited

U.S. PATENT DOCUMENTS

| | | | |
|---|---|---|---|
| 2013/0335302 A1* | 12/2013 | Crane .................... | H04N 23/74 |
| | | | 348/169 |
| 2019/0096057 A1 | 3/2019 | Allen et al. | |
| 2019/0268072 A1* | 8/2019 | Aoyama .............. | H04B 10/116 |
| 2020/0025690 A1* | 1/2020 | Koshihara ........... | G06F 18/2433 |
| 2020/0088650 A1 | 3/2020 | Harada et al. | |
| 2020/0140993 A1 | 5/2020 | Noh | |
| 2020/0364906 A1 | 11/2020 | Shimodaira | |
| 2022/0318985 A1* | 10/2022 | Nakagawa ............. | G01N 23/04 |
| 2023/0005123 A1* | 1/2023 | Kondo ................. | G06T 7/0002 |
| 2025/0157685 A1* | 5/2025 | Nishizawa .............. | B64G 1/40 |

FOREIGN PATENT DOCUMENTS

| | | | |
|---|---|---|---|
| JP | 2000-172845 A | 6/2000 |
| JP | 2000-214101 A | 8/2000 |
| JP | 2018-204063 A | 12/2018 |
| JP | 2020-070494 A | 5/2020 |

OTHER PUBLICATIONS

Office Action issued in corresponding Chinese Patent Application No. 202180079661.6, dated Jul. 7, 2025, with translation (22 pages).

Extended European Search Report issued in related European Patent Application No. 21897841.9 mailed Apr. 2, 2024 (11 pages).

Office Action issued in counterpart Chinese Patent Application No. 202180079661.6 mailed Nov. 5, 2025 (22 pages).

Office Action issued in corresponding Chinese Patent Application No. 202180079661.6, dated Jan. 28, 2026, with translation (22 pages).

* cited by examiner

[FIG. 1]
<u>1</u>
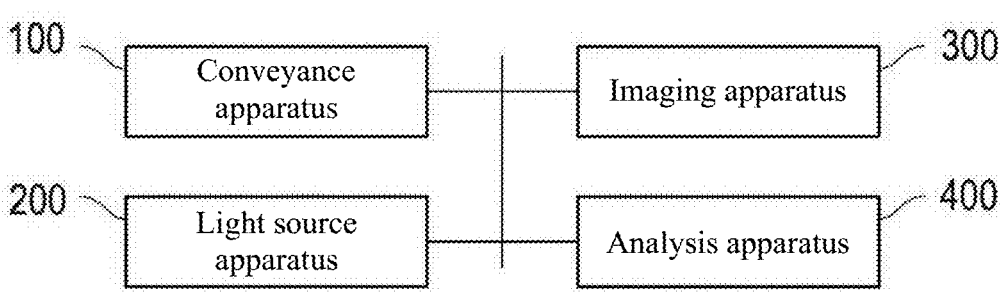

[FIG. 2]
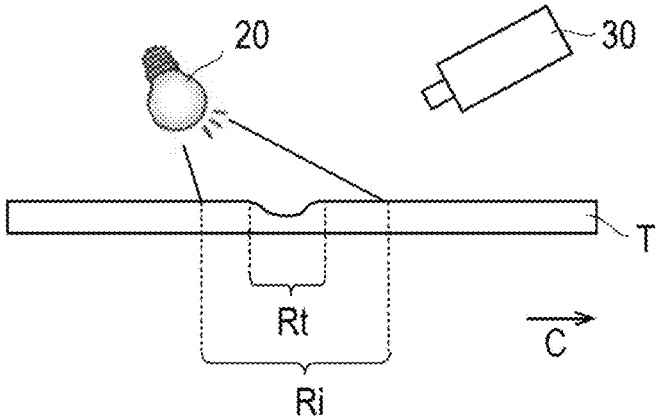

[FIG. 3]
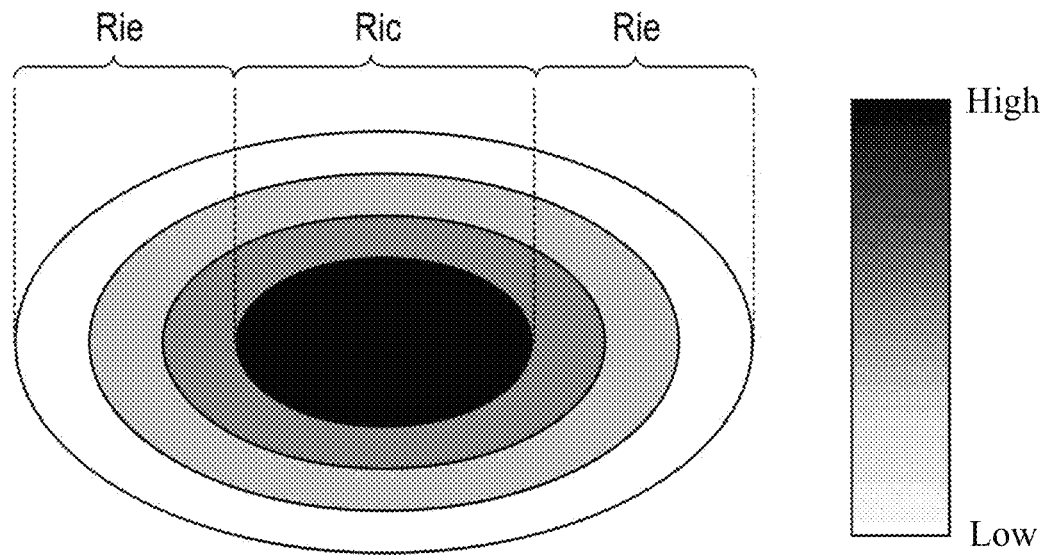

[FIG. 4A]
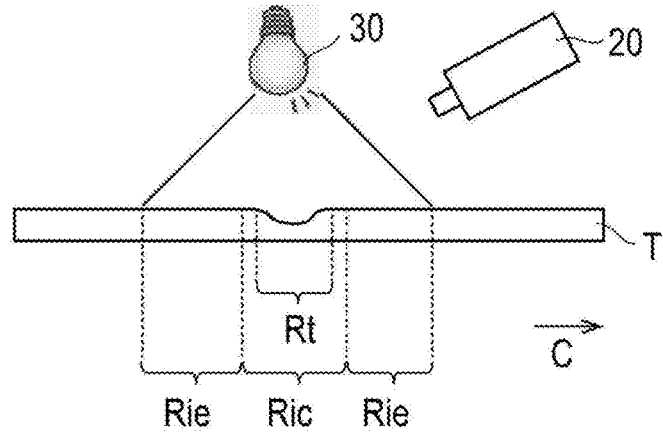
[FIG. 4B]
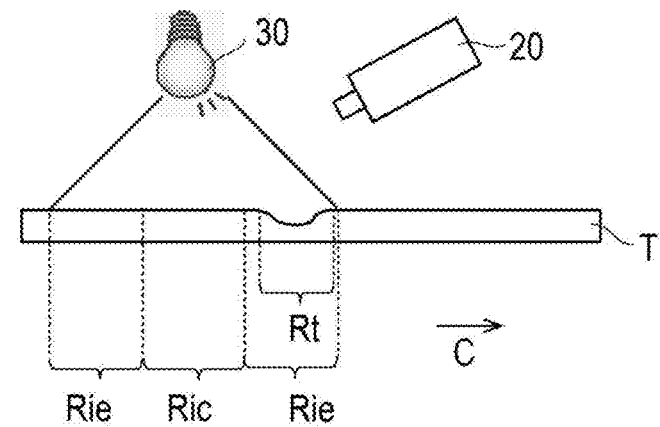
[FIG. 4C]
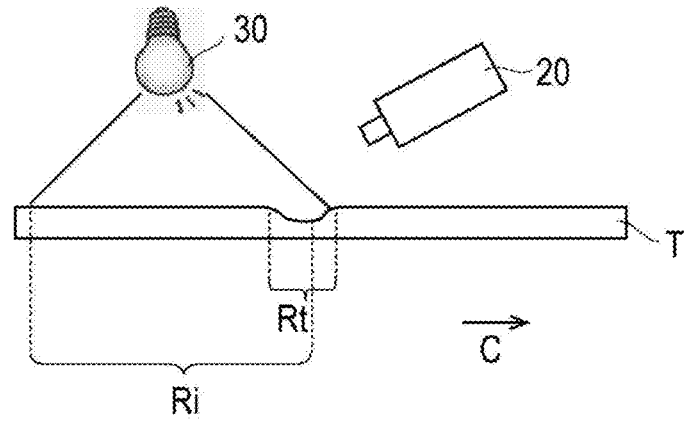

[FIG. 5]
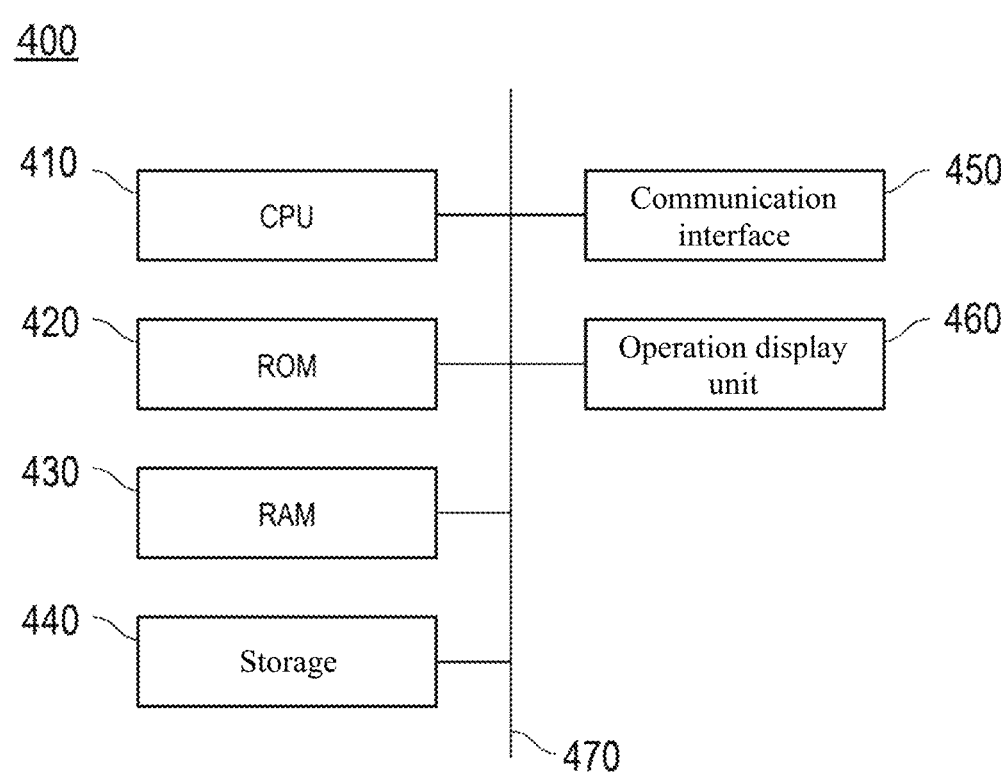
[FIG. 6]
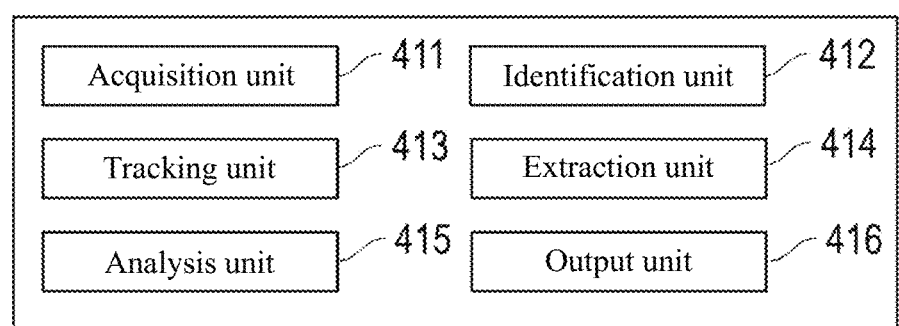

[FIG. 7]

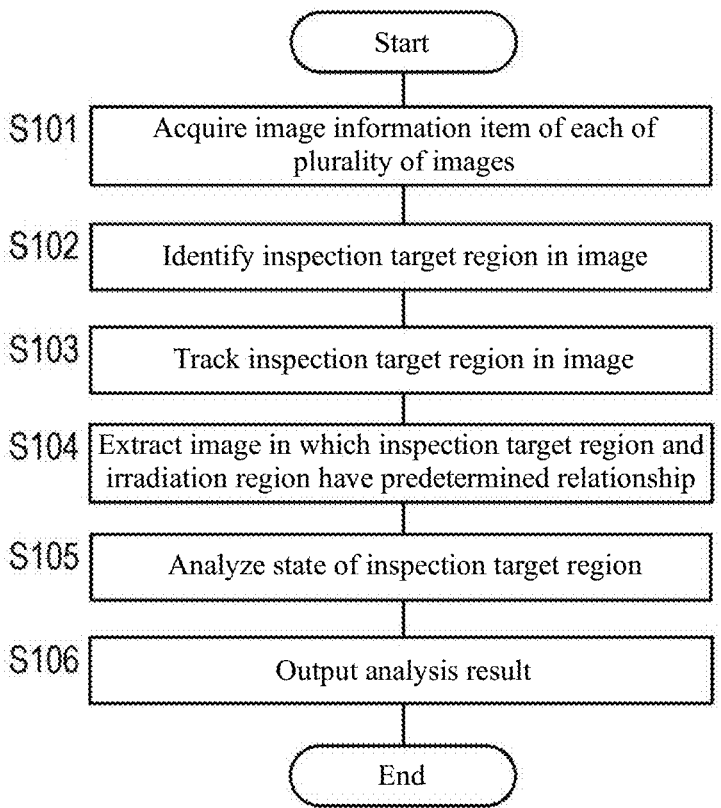

Start

S101 | Acquire image information item of each of plurality of images

S102 | Identify inspection target region in image

S103 | Track inspection target region in image

S104 | Extract image in which inspection target region and irradiation region have predetermined relationship S105 | Analyze state of inspection target region S106 | Output analysis result End

[FIG. 8]

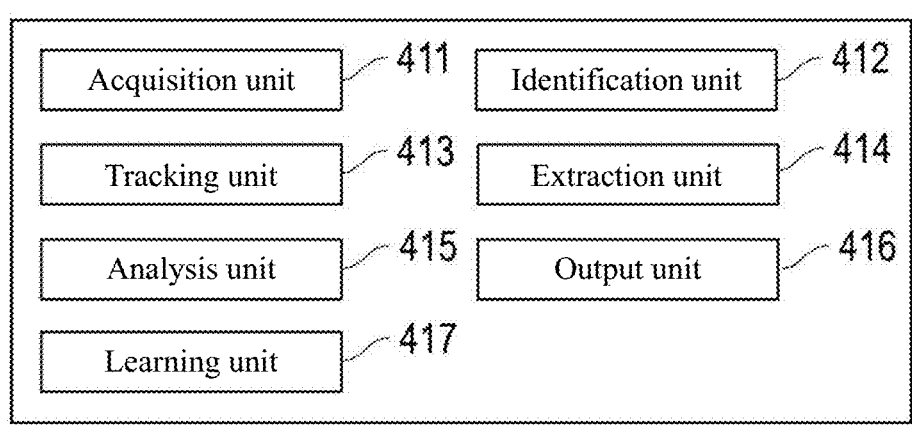

400

| Acquisition unit | 411 | Identification unit | 412 |
| Tracking unit | 413 | Extraction unit | 414 |
| Analysis unit | 415 | Output unit | 416 |
| Learning unit | 417 | | |

[FIG. 9]
400
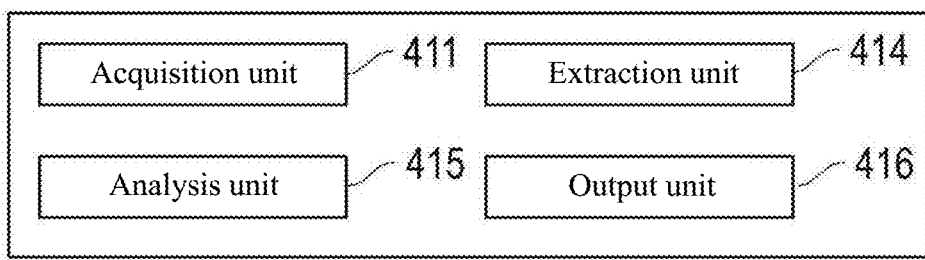

ANALYSIS APPARATUS, INSPECTION SYSTEM, AND LEARNING APPARATUS

CROSS-REFERENCE TO RELATED APPLICATION

The entire disclosure of Japanese Patent Application No. 2020-198500 filed on Nov. 30, 2020, including description, claims, drawings, and abstract, is incorporated herein by reference.

BACKGROUND

Technical Field

The present invention relates to an analysis apparatus, an inspection system, and a learning apparatus.

Description of Related Arts

Defects may occur on a coated surface of an automobile or the like. Development of an inspection system for detecting such a defect is underway (e.g., Patent Literature 1). In this inspection system, for example, a defect is detected by sequentially imaging a partial region of an automobile or the like under light irradiation.

PATENT LITERATURE

Patent Literature 1: JP 2000-172845 A

It is difficult to improve accuracy of an inspection in an inspection system for detecting a defect in a coated surface of an automobile or the like.

SUMMARY

One or more embodiments of the present invention provide an analysis apparatus, an inspection system, and a learning apparatus that can improve the accuracy of the inspection or detecting a defect in a coated surface of an automobile or the like.

One or more embodiments of the present invention deal with the above issues by the following means.

(1) An analysis apparatus including: a hardware processor that: acquires image information items of images regarding a target that are captured while the target is irradiated with light; extracts, based on the image information items, an image in which an irradiation region where the target is irradiated with the light and an inspection target region of the target have a predetermined relationship, from among the images; and analyzes a state of the inspection target region based on the image information items of the extracted image.

(2) The analysis apparatus according to (1), wherein the irradiation region has a central portion and a peripheral portion outside the central portion, and the hardware processor extracts an image in which the peripheral portion of the irradiation region overlaps at least a part of the inspection target region, from among the images.

(3) The analysis apparatus according to (1), wherein the hardware processor extracts an image in which a peripheral edge of the irradiation region overlaps the inspection target region, from among the images.

(4) The analysis apparatus according to (1), wherein the hardware processor extracts an image in which luminance of the inspection target region has predetermined non-uniformity, from among the images.

(5) The analysis apparatus according to (1), wherein the hardware processor extracts the image based on a difference between a maximum luminance and a minimum luminance of the inspection target region and an average luminance.

(6) The analysis apparatus according to (1), wherein the hardware processor extracts the image based on at least one of a distribution and a histogram of luminance of the inspection target region.

(7) The analysis apparatus according to (1), wherein the hardware processor acquires the image information items of the images regarding the target that are captured while any one of the target, the irradiation region, and an image capturing position moves.

(8) The analysis apparatus according to (7), wherein the hardware processor identifies the inspection target region in the images based on the acquired image information items and tracks the inspection target region in the images based on the identified inspection target region, and extracts the image based on the tracked inspection target region.

(9) The analysis apparatus according to (1), wherein the hardware processor extracts a plurality of the images in each of which the irradiation region and the inspection target region have a predetermined relationship, from among the images, and analyzes the state of the inspection target region based on the image information items of the plurality of the images.

(10) The analysis apparatus according to (1), wherein the hardware processor analyzes the state of the inspection target region using a learned model.

(11) The analysis apparatus according to (10), wherein the learned model is learned in advance by using training data of a combination of the inspection target region in the image extracted and a ground truth label of the state of the inspection target region.

(12) The analysis apparatus according to (1), wherein the hardware processor analyzes the state of the inspection target region using deep learning.

(13) The analysis apparatus according to any one of (1), wherein the inspection target region is a candidate region of a defect in the target, and the hardware processor analyzes a shape of the defect.

(14) The analysis apparatus according to (13), wherein the shape is a recessed shape or a protrusion shape.

(15) An inspection system including: a light source apparatus that irradiates a target with light; an imaging apparatus that images the target irradiated with light from the light source apparatus; and the analysis apparatus according to (1).

(16) A learning apparatus including: an hardware processor that: acquires image information items of images regarding a target that are captured while the target is irradiated with light; extracts, based on the image information items, an image in which an irradiation region in which the target is irradiated with the light and an inspection target region of the target have a predetermined relationship, from among the images; analyzes a state of the inspection target region based on the image information items of the extracted image using a learned model; and causes the learned model to perform further learning.

According to the analysis apparatus, the inspection system, and the learning apparatus of one or more embodiments of the present invention, the image in which the irradiation region and the inspection target region of the target have the predetermined relationship is extracted from among the plurality of images. Thus, it is possible to extract the image in which the state of the inspection target region is more easily analyzed. Therefore, the accuracy of the inspection can be improved.

BRIEF DESCRIPTION OF DRAWINGS

FIG. 1 is a diagram illustrating a schematic configuration of an inspection system according to one or more embodiments of the present invention.

FIG. 2 is a side view illustrating an example of a target to be inspected by the inspection system illustrated in FIG. 1.

FIG. 3 is a diagram of a luminance image of an irradiation region irradiated with light from a light source illustrated in FIG. 2.

FIG. 4A is a side view illustrating an example of a positional relationship among an inspection target region of the target illustrated in FIG. 2, the light source, and a camera.

FIG. 4B is a side view illustrating another example of the positional relationship among the inspection target region of the target, the light source, and the camera illustrated in FIG. 4A.

FIG. 4C is a side view illustrating yet another example of the positional relationship among the inspection target region of the target, the light source, and the camera illustrated in FIG. 4A.

FIG. 5 is a block diagram illustrating an example of a schematic configuration of an analysis apparatus illustrated in FIG. 1.

FIG. 6 is a block diagram illustrating an example of a functional configuration of a CPU illustrated in FIG. 5.

FIG. 7 is a flowchart illustrating an example of processing performed by the analysis apparatus illustrated in FIG. 1.

FIG. 8 is a block diagram illustrating a functional configuration of an analysis apparatus according to a first modification example.

FIG. 9 is a block diagram illustrating a functional configuration of an analysis apparatus according to a second modification example.

DETAILED DESCRIPTION OF EMBODIMENTS

Embodiments of the present invention will be described hereinafter with reference to the attached drawings. Note that in the description of the drawings, the same components are denoted by the same reference numerals, and redundant description will be omitted. In addition, dimensional ratios in the drawings are exaggerated for convenience of explanation and may be different from actual ratios.
[Configuration of Inspection System]

FIG. 1 is a Diagram Illustrating a Schematic Configuration of an Inspection System 1 according to one or more embodiments of the present invention, and FIG. 2 illustrates an example of a predetermined target (target T) to be inspected by the inspection system 1. The inspection system 1 includes, for example, a conveyance apparatus 100, a light source apparatus 200, an imaging apparatus 300, and an analysis apparatus 400 (FIG. 1). The conveyance apparatus 100, the light source apparatus 200, the imaging apparatus 300, and the analysis apparatus 400 are communicably connected to each other via a network such as a local area network (LAN), a telephone network, or a data communication network in a wired or wireless manner.

In the inspection system 1, for example, a shape of a surface of the target T is analyzed, and the surface is inspected for defects. For example, the target T is a vehicle body, and the inspection system 1 inspects a coated surface of the vehicle body for defects. For example, the surface of a vehicle body is subjected to surface preparation, metallic coating, and clear coating and has a multilayer structure. In a case where a foreign substance or the like is mixed in the multilayer structure when a coating is applied to the surface of the vehicle body, surface defects having an uneven shape may occur on the surface of the vehicle body. For example, the inspection system 1 detects a region (hereinafter referred to as an inspection target region Rt) that is a candidate for such a surface defect, and analyzes a shape of a defect in the inspection target region Rt (FIG. 2). Although FIG. 2 illustrates the inspection target region Rt including a recessed defect, the inspection target region Rt may include a protrusion defect or a defect having another shape.

The target T may be something other than the vehicle body, and the inspection system 1 may inspect a surface other than the coated surface. Although the inspection system 1 may be used for inspection of a portion other than the surface of the target T, the inspection system 1 can be suitably used for inspection of the surface of the target T.

The conveyance apparatus 100 conveys the target T along a predetermined direction (e.g., a conveyance direction C indicated by an arrow in FIG. 2) at a predetermined speed. The conveyance apparatus 100 includes, for example, a placement section on which the target T is placed and a drive unit that moves the placement section.

The light source apparatus 200 is for irradiating the target T with light, and includes a light source 20 (FIG. 2). The light source 20 is, for example, a linear light source. When the target T is irradiated with the light generated by the light source 20, a region (hereinafter referred to as an irradiation region Ri) in which the target T is irradiated with the light is formed. The light source 20 is fixed at a predetermined position, for example, and irradiates, from the predetermined position, the target T moving in the conveyance direction C with light. Thus, the position of the irradiation region Ri relative to the inspection target region Rt of the target T changes. The light source apparatus 200 has, for example, a plurality of light sources 20, and the plurality of light sources 20 are disposed at predetermined intervals along the conveyance direction of the target T. The plurality of light sources 20 may be disposed at predetermined positions in the conveyance direction of the target T.

FIG. 3 illustrates an image of luminance of the irradiation region Ri formed by the light source 20. The irradiation region Ri has, for example, a substantially circular or substantially elliptical planar shape. The luminance of the irradiation region Ri is highest in a central portion (central portion Ric), and the luminance in the central portion Ric is substantially uniform. On the other hand, the luminance gradually decreases as the distance from the central portion Ric increases. That is, in the irradiation region Ri, a change in the luminance in a peripheral portion (peripheral portion Rie) outside the central portion Ric is larger than a change in the luminance in the central portion Ric. In particular, a change in illumination intensity is large in the vicinity of a peripheral edge of the irradiation region Ri. Therefore, by imaging the peripheral portion Rie of the irradiation region Ri, for example the region overlapping with the vicinity of the peripheral edge of the irradiation region Ri, it is possible to obtain images similar to the captured images at various illumination intensities.

The imaging apparatus 300 is for imaging the target T and includes a camera 30 (FIG. 2). The imaging apparatus 300 has, for example, a plurality of cameras 30, and each camera 30 is fixed at a predetermined position. Each of the plurality of cameras 30 continuously or discontinuously images each portion of the surface of the target T being conveyed. Thus, in the inspection system 1, the surface of the target T is imaged while the position of the irradiation region Ri relative to the target T is changed, more specifically, while the positions of the central portion Ric and the peripheral portion Rie relative to the inspection target region Rt of the target T are changed.

FIGS. 4A to 4C each illustrate a positional relationship among the inspection target region Rt of the target T conveyed along the conveyance direction C, the light source 20 (irradiation region Ri), and the camera 30. When the target T is conveyed along the conveyance direction C, for example, the central portion Ric (FIG. 4A), the peripheral portion Rie (FIG. 4B), and the vicinity of the peripheral edge (FIG. 4C) of the irradiation region Ri sequentially overlap the inspection target region Rt of the target T. Therefore, images of the inspection target region Rt of the target T overlapping the central portion Ric, the peripheral portion Rie, and the vicinity of the peripheral edge of the irradiation region Ri are captured by the camera 30 fixed at a predetermined position. The imaging apparatus 300 outputs a plurality of images captured by the camera 30 in this manner.

The analysis apparatus 400 mainly transmits and receives various information items and instructions to and from the imaging apparatus 300. The analysis apparatus 400 acquires an image information item of each of the plurality of images captured by the imaging apparatus 300, and analyzes the defect on the surface of the target T. The analysis apparatus 400 is, for example, a computer such as a server or a PC. The analysis apparatus 400 may include a plurality of devices, and for example, may be virtually configured as a cloud server by a large number of servers.

FIG. 5 is a block diagram illustrating a schematic configuration of the analysis apparatus 400.

As illustrated in FIG. 5, the analysis apparatus 400 includes a central processing unit (CPU) (or a hardware processor) 410, a read only memory (ROM) 420, a random access memory (RAM) 430, a storage 440, a communication interface 450, and an operation display unit (or operation display device) 460. These components are communicably connected to each other via a bus 470.

The CPU 410 controls the above-described components and performs various types of arithmetic processing in accordance with programs recorded in the ROM 420 or the storage 440.

The ROM 420 stores various programs and various data.

The RAM 430, as a workspace, temporarily stores therein instructions and data.

The storage 440 stores various programs including an operating system and various data. For example, an application for transmitting and receiving various information items to and from another apparatus and determining an analysis result to be output based on various information items acquired from another apparatus is installed in the storage 440. Furthermore, the storage 440 stores candidates for an analysis result to be output and information items required for determining an analysis result to be output based on various information items. Note that when a machine learning model is used to determine an analysis result, the storage 440 may store a learned model or the like necessary for machine learning.

The communication interface 450 is an interface for communicating with another apparatus. As the communication interface 450, communication interfaces based on various wired or wireless standards are used.

The operation display unit 460 is, for example, a touch panel type display, and displays various information items and receives various kinds of input from a user.

FIG. 6 is a block diagram illustrating the functional configuration of the analysis apparatus 400.

The CPU 410 reads a program stored in the storage 440 and executes processing, so that the analysis apparatus 400 functions as, for example, an acquisition unit 411, an identification unit 412, a tracking unit 413, an extraction unit 414, an analysis unit 415, and an output unit 416.

The acquisition unit 411 acquires an image information item of each of the plurality of images captured by the imaging apparatus 300. The plurality of images captured by the imaging apparatus 300 include a plurality of images regarding the inspection target region Rt of the target T that are captured while the inspection target region Rt of the target T is irradiated with light from the light source 20 (refer to FIG. 4A to FIG. 4C).

The identification unit 412 identifies the inspection target region Rt in the image based on the image information items acquired by the acquisition unit 411. The identification unit 412 may identify a plurality of inspection target regions Rt. The identification unit 412 identifies the inspection target region Rt in the image captured by the imaging apparatus 300 by using, for example, machine learning. For example, the identification unit 412 identifies the inspection target region Rt using the learned model. In the learned model, for example, an image in which only a region without a defect is imaged and a non-defect label is assigned, and an image in which a defect is imaged and a defect label and a ground truth label of a position of the defect are assigned are learned in advance. Alternatively, the inspection target region Rt may be identified by scanning an image using a learned model in which a method of classifying a defect and a non-defect is learned. The identification unit 412 may identify the inspection target region Rt without using machine learning, and may identify the inspection target region Rt using, for example, a shape feature. At this time, the inspection target region Rt is identified based on, for example, an image feature derived from a luminance difference between the inspection target region Rt and its periphery.

The tracking unit 413 tracks the inspection target region Rt in each of the plurality of images based on the inspection target region Rt identified by the identification unit 412. The tracking unit 413 may track each of the plurality of inspection target regions Rt. The tracking unit 413 estimates the position of the inspection target region Rt in another image based on, for example, the position of the inspection target region Rt in a predetermined image and the position where the image is captured. Specific examples of the tracking method include the following methods. For example, tracking is performed by estimating a movement amount of the inspection target region Rt based on speed information of the conveyance apparatus 100. Alternatively, tracking may be performed on the assumption that the movement amount of the inspection target region Rt between different images is limited. For example, the position of the inspection target region Rt in the image identified by the identification unit 412 may be used as a reference, and the processing of identifying the inspection target region Rt may be performed again in another image to track the inspection target region Rt. After the movement amount of the inspection target region Rt is estimated based on the speed information of the conveyance apparatus 100, the processing of identifying the inspection target region Rt may be further performed. The tracking unit 413 may cut out the inspection target region Rt in the image.

The extraction unit 414 extracts an image in which the irradiation region Ri and the inspection target region Rt tracked by the tracking unit 413 have a predetermined relationship. The position of the irradiation region Ri in each image is determined based on, for example, luminance. Here, the image in which the inspection target region Rt and the irradiation region Ri have a predetermined relationship is an image in which a state of the inspection target region Rt is easily analyzed based on the positional relationship with the irradiation region Ri.

The extraction unit 414 extracts, for example, an image in which the luminance of the inspection target region Rt has predetermined non-uniformity, from an image including the inspection target region Rt. Specifically, the extraction unit 414 extracts an image in which the peripheral portion Rie of the irradiation region Ri overlaps at least a part of the inspection target region Rt. Alternatively, the extraction unit 414 extracts an image in which the vicinity of the peripheral edge of the irradiation region Ri overlaps at least a part of the inspection target region Rt. Although details will be described later, this makes it possible to extract an image in which the state of the inspection target region Rt is more easily analyzed from a plurality of images captured by the imaging apparatus 300, and to improve the accuracy of analysis by the analysis unit 415.

The relationship between the irradiation region Ri and the inspection target region Rt is determined based on, for example, the difference between the maximum luminance and the minimum luminance of the inspection target region Rt in the image and the average luminance. The extraction unit 414 extracts, for example, an image in which the difference between the maximum luminance and the minimum luminance of the inspection target region Rt in the image is within a predetermined range and the average luminance of the inspection target region Rt in the image is within a predetermined range. The value in the predetermined range is determined, for example, by experiments or the like.

Alternatively, the relationship between the irradiation region Ri and the inspection target region Rt may be determined based on at least one of a distribution and a histogram of luminance in the vicinity of the inspection target region Rt in the image. The extraction unit 414 extracts, for example, an image in which the degree of distribution and the median of the histogram of the luminance in the vicinity of the inspection target region Rt in the image are within predetermined ranges. This predetermined range is determined, for example, by experiments or the like.

In one or more embodiments, the extraction unit 414 extracts a plurality of images for one inspection target region Rt. Since the extraction unit 414 extracts a plurality of images for one inspection target region Rt, the accuracy of analysis by the analysis unit 415 can be improved.

The analysis unit 415 analyzes the state of the inspection target region Rt based on the image information item of the image extracted by the extraction unit 414. Specifically, the analysis unit 415 analyzes the shape of the defect in the inspection target region Rt. For example, the analysis unit 415 determines whether the defect in the inspection target region Rt of the target T has a recessed shape or a protrusion shape. The analysis unit 415 may determine the shape of the defect for each of the image information items of the plurality of images extracted by the extraction unit 414 and then integrate these determination results to derive an analysis result.

The analysis unit 415 analyzes the state of the inspection target region Rt of the target T using machine learning, for example. The machine learning includes deep learning using a neural network. For example, the analysis unit 415 analyzes the state of the inspection target region Rt using a learned model. For example, the learned model is learned in advance using training data of a combination of the image in which the defect is imaged and a ground truth label of the shape of the defect. The image used as the training data is, for example, the image extracted by the extraction unit 414. By using a learned model that has been learned using images extracted in this manner, it is possible to reduce noise and improve accuracy of analysis.

The output unit 416 outputs, by display on the operation display unit 460 or the like, the analysis result of the state of the inspection target region Rt of the target T analyzed by the analysis unit 415. The output unit 416 may output the analysis result by transmission to an external device via the communication interface 450.

[Outline of Processing of Analysis Apparatus]

FIG. 7 is a flowchart illustrating a procedure of processing executed in the analysis apparatus 400. The processing of the analysis apparatus 400 illustrated in the flowchart of FIG. 7 is stored as a program in the storage 440 of the analysis apparatus 400, and is executed by the control of each unit by the CPU 410.

First, the analysis apparatus 400 acquires an image information item of each of a plurality of images regarding the target T that are captured by the imaging apparatus 300 (step S101). Next, the analysis apparatus 400 identifies the inspection target region Rt of the target T in the image based on the image information items acquired in step S101 (step S102).

Subsequently, the analysis apparatus 400 tracks the inspection target region Rt in each of the plurality of images based on the inspection target region Rt identified in step S102 (step S103).

Next, based on the inspection target region Rt tracked in step S103, the analysis apparatus 400 extracts an image in which the inspection target region Rt and the irradiation region Ri have a predetermined relationship (step S104). In step S104, for example, an image in which the peripheral portion Rie of the irradiation region Ri overlaps at least a part of the inspection target region Rt or an image in which the vicinity of the peripheral edge of the irradiation region Ri overlaps at least a part of the inspection target region Rt is extracted.

Subsequently, the analysis apparatus 400 analyzes the state of the inspection target region Rt based on the image information item of the image extracted in step S104 (step S105). For example, the analysis apparatus 400 analyzes the shape of the defect in the inspection target region Rt, and determines whether the defect in the inspection target region Rt of the target T has a recessed shape or a protrusion shape.

After analyzing the state of the inspection target region Rt of the target T in the processing of step S105, the analysis apparatus 400 outputs the analysis result (step S106) and ends the processing.

As described above, according to the analysis apparatus 400 of one or more embodiments, the extraction unit 414 extracts an image in which the irradiation region Ri and the inspection target region Rt of the target T have a predetermined relationship. Thus, it is possible to extract an image in which the state of the inspection target region Rt is more easily analyzed. Hereinafter, this effect will be described.

When the presence or absence of a defect in the inspection target region and the shape of the defect or the like are inspected based on an image, the accuracy of inspection can be improved by using an image in which the state of the inspection target region is easily analyzed. As a method of obtaining an image in which the state of the inspection target region is easily analyzed, for example, a method of performing imaging while changing an illumination condition near the defect may be considered. However, this method requires complicated control for changing the illumination conditions or a light source or the like with various illumination intensities, which may increase costs.

On the other hand, in the analysis apparatus 400 according to one or more embodiments, an image in which the irradiation region Ri and the inspection target region Rt have a predetermined relationship is extracted from the images captured by the imaging apparatus 300. Therefore, the analysis apparatus 400 can extract, from all the images captured by the imaging apparatus 300, only an image in which the state of the inspection target region Rt is more easily analyzed based on the relationship with the irradiation region Ri. Specifically, the analysis apparatus 400 extracts an image in which the luminance in the vicinity of the inspection target region Rt has predetermined non-uniformity, an image in which the peripheral portion Rie of the irradiation region Ri overlaps at least a part of the inspection target region Rt, or an image in which the vicinity of the peripheral edge of the irradiation region Ri overlaps at least a part of the inspection target region Rt.

In this manner, in the analysis apparatus 400, the state of the inspection target region Rt is analyzed based on the image in which the state of the inspection target region Rt is more easily analyzed. On the other hand, an image in which the state of the inspection target region Rt is not easily analyzed is not used for analysis. The image in which the state of the inspection target region Rt is not easily analyzed is, for example, an image in which the entire inspection target region Rt overlaps the central portion Ric of the irradiation region Ri, an image in which the entire inspection target region Rt is outside the irradiation region Ri, or the like. Therefore, it is possible to improve the accuracy of the inspection in the analysis apparatus 400, compared to a case where the state of the inspection target region Rt is analyzed in a state including an image in which the state of the inspection target region Rt of the target T is not easily analyzed. In the inspection system 1 including such an analysis apparatus 400, complicated control of illumination conditions, various light sources, and the like are unnecessary, and it is possible to improve accuracy of inspection while suppressing cost.

In particular, when the analysis apparatus 400 performs analysis using deep learning, the accuracy of inspection can be effectively improved as described below. In deep learning, a feature is extracted from an image by a convolution operation. For this reason, in a case where an analysis image includes an image in which the shape of the defect is not easily analyzed, the amount of noise increases, and the accuracy of analysis tends to decrease. Therefore, extracting in advance an image in which the state of the inspection target region Rt of the target T is easily analyzed and performing analysis by deep learning using this image can reduce noise and effectively improve the accuracy of inspection.

As described above, the analysis apparatus 400 according to one or more embodiments extracts an image in which the irradiation region Ri and the inspection target region Rt of the target T have a predetermined relationship. Thus, it is possible to extract an image in which the state of the inspection target region Rt is more easily analyzed. Therefore, it is possible to improve the accuracy of the inspection of the inspection system 1.

In addition, the analysis apparatus 400 may extract an image based on the difference between the maximum luminance and the minimum luminance of the inspection target region Rt and the average luminance. Thus, an image in which the shape of the inspection target region Rt is more reliably analyzed is extracted, and the accuracy of the inspection can be further improved.

In addition, the analysis apparatus 400 may extract a plurality of images for one inspection target region Rt and analyze the state of the one inspection target region Rt based on the image information item of each of the plurality of images. This makes it possible to further improve the accuracy of analysis as compared with a case where the state of one inspection target region Rt is analyzed based on an image information item of a single image.

In one or more embodiments, the analysis apparatus 400 includes the identification unit 412 and the tracking unit 413. Thus, the extraction unit 414 can extract an image based on the tracked inspection target region Rt. Therefore, as compared with extraction from all the images captured by the imaging apparatus 300, it is easier to extract an image, making it possible to increase the accuracy of analysis. In particular, when the analysis apparatus 400 analyzes the state of each of the plurality of inspection target regions Rt, the accuracy of analysis can be effectively increased due to the following reasons. When the analysis apparatus 400 analyzes the states of the plurality of inspection target regions Rt, the tracking unit 413 tracks each of the plurality of inspection target regions Rt. Therefore, confusion between the plurality of inspection target regions Rt is less likely to occur, and the accuracy of analysis can be increased.

Hereinafter, other embodiments will be described. Modification examples of the above-described embodiments will be explained, and identical descriptions and/or descriptions of shared points will be omitted or simplified.

First Modification Example

FIG. 8 illustrates an example of a functional configuration of an analysis apparatus 400 according to a first modification example. The analysis apparatus 400 includes a learning unit 417 in addition to the acquisition unit 411, the identification unit 412, the tracking unit 413, the extraction unit 414, the analysis unit 415, and the output unit 416. Except this point, the analysis apparatus 400 according to the first modification example has the same configuration as the analysis apparatus 400 according to the above-described embodiments, and achieves the same effects.

The learning unit 417 causes the analysis unit 415 to perform learning. Specifically, the learning unit 417 causes the analysis unit 415 to learn a combination of the inspection target region Rt in the image extracted by the extraction unit 414 and the state of the inspection target region Rt. Here, the learning unit 417 learns only the image extracted by the extraction unit 414, that is, the image in which the irradiation region Ri and the inspection target region Rt have a predetermined relationship. Thus, since an image in which the state of the inspection target region Rt is more easily analyzed is learned, noise is reduced, and the accuracy of learning can be improved. That is, as compared with a case where the learning unit 417 performs learning including an image in which the state of the inspection target region Rt is not easily analyzed, it is possible to improve accuracy of the analysis unit 415 learned by the learning unit 417.

In this manner, the analysis apparatus 400 may have a function as a learning apparatus. Alternatively, a learning apparatus may be provided separately from the analysis apparatus 400.

Second Modification Example

FIG. 9 illustrates an example of a functional configuration of an analysis apparatus 400 according to a second modification example. The analysis apparatus 400 includes the acquisition unit 411, the extraction unit 414, the analysis unit 415, and the output unit 416. That is, this analysis apparatus 400 does not include the identification unit and the tracking unit (the identification unit 412 and the tracking unit 413 in FIG. 6). Except this point, the analysis apparatus 400 according to the second modification example has the same configuration as the analysis apparatus 400 according to the above-described embodiments, and achieves the same effects.

In the analysis apparatus 400, the extraction unit 414 extracts an image in which the inspection target region Rt of the target T and the irradiation region Ri have a predetermined relationship, based on the image information items acquired by the acquisition unit 411. As described above, the analysis apparatus 400 may extract an image based on the image information items acquired by the acquisition unit 411.

The configuration of the inspection system 1 described above is the main configuration in describing the features of the above-described embodiments and modification examples, and the present invention is not limited to the above-described configuration and can be variously modified within the scope of the claims. Furthermore, configurations included in a general inspection system are not excluded.

For example, although an example in which the target T is conveyed in a predetermined direction and the light source 20 and the camera 30 are fixed at predetermined positions has been described in the above-described embodiments, the target T may be fixed at a predetermined position and the light source 20 or the camera 30 may be moved. That is, in the inspection system 1, the target T may be imaged while any one of the target T, the irradiation region Ri, and the image capturing position moves.

Furthermore, each of the conveyance apparatus 100, the light source apparatus 200, the imaging apparatus 300, and the analysis apparatus 400 may include a plurality of devices, or these apparatuses may be configured as a single apparatus.

The function of each component may be implemented by another component. For example, the light source apparatus 200 and the imaging apparatus 300 may be integrated into the analysis apparatus 400, and some or all of the functions of the light source apparatus 200 and the imaging apparatus 300 may be implemented by the analysis apparatus 400.

In the above-described embodiments and modification examples, an example in which the inspection system 1 analyzes the state of the inspection target region Rt of the target T by machine learning has been described, but the inspection system 1 may analyze the state of the inspection target region Rt of the target T by another method such as statistical processing.

In addition, some steps of the above-described flowchart may be omitted, and other steps may be added. Furthermore, some of the steps may be executed at the same time, and one step may be divided into a plurality of steps and executed.

Furthermore, the means and method for performing various kinds of processing in the inspection system 1 described above can be implemented by either a dedicated hardware circuit or a programmed computer. The instructions may be provided by a computer-readable recording medium such as a USB memory or a digital versatile disc (DVD)-ROM, or may be provided online via a network such as the Internet. In this case, the instructions recorded on the computer-readable recording medium are generally transferred to and stored in a storage unit such as a hard disk. Furthermore, the instructions may be provided as a single piece of application software, or may be incorporated, as a function, into software of an apparatus such as the detection unit.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST

1 inspection system
100 conveyance apparatus
200 light source apparatus
20 light source
300 imaging apparatus
30 camera
400 analysis apparatus
410 CPU
420 ROM
430 RAM
440 storage
450 communication interface
460 operation display unit
T target
Rt inspection target region
Ri irradiation region

The invention claimed is:

1. An analysis apparatus comprising:
a hardware processor that:
acquires image information items of images regarding a target that are captured while the target is irradiated with light,
extracts, based on the image information items, an image in which a peripheral portion of an irradiation region of the target overlaps at least a part of an inspection target region of the target, from among the images, wherein
the irradiation region is a region irradiated with the light, and includes:
a central portion that has uniform luminance; and
the peripheral portion that is outside of the central portion and has non-uniform luminance, and
analyzes a state of the inspection target region based on each of the image information items of the extracted image.

2. The analysis apparatus according to claim 1, wherein the hardware processor extracts an image in which a peripheral edge of the irradiation region overlaps the inspection target region, from among the images.

3. The analysis apparatus according to claim 1, wherein the hardware processor extracts an image in which the inspection target region has non-uniform luminance, from among the images.

4. The analysis apparatus according to claim 1, wherein the hardware processor extracts the image based on a difference between a maximum luminance and a minimum luminance of the inspection target region and an average luminance of the inspection target region.

5. The analysis apparatus according to claim 1, wherein the hardware processor extracts the image based on at least one of a distribution and a histogram of luminance of the inspection target region.

6. The analysis apparatus according to claim 1, wherein the hardware processor acquires the image information items of the images regarding the target that are captured while any one of the target, the irradiation region, and an image capturing position moves.

7. The analysis apparatus according to claim 6, wherein the hardware processor further:

identifies the inspection target region in each of the images based on each of the image information items, tracks the inspection target region in each of the images based on the identified inspection target region, and extracts the image based on the tracked inspection target region.

8. The analysis apparatus according to claim 1, wherein the hardware processor further:

extracts a plurality of the images in each of which the peripheral portion overlaps at least a part of the inspection target region, from among the images, and analyzes the state of the inspection target region based on the image information items of the images.

9. The analysis apparatus according to claim 1, wherein the hardware processor analyzes the state of the inspection target region using a learned model.

10. The analysis apparatus according to claim 9, wherein the learned model is learned in advance by using training data of a combination of the inspection target region in the extracted image and a ground truth label of the state of the inspection target region.

11. The analysis apparatus according to claim 1, wherein the hardware processor analyzes the state of the inspection target region using deep learning.

12. The analysis apparatus according to claim 1, wherein the inspection target region is a candidate region of a defect in the target, and the hardware processor analyzes a shape of the defect.

13. The analysis apparatus according to claim 12, wherein the shape is a recessed shape or a protrusion shape.

14. An inspection system comprising:

a light source apparatus that irradiates a target with light;

an imaging apparatus that images the target irradiated with the light from the light source apparatus; and the analysis apparatus according to claim 1.

15. A learning apparatus comprising:

a hardware processor that:

acquires image information items of a plurality of images regarding a target that are captured while the target is irradiated with light, extracts, based on the image information items, an image in which a peripheral portion of an irradiation region of the target overlaps at least a part of an inspection target region of the target, from among the images, wherein the irradiation region is a region irradiated with the light, and includes:

a central portion that has uniform luminance; and the peripheral portion that is outside of the central portion and has non-uniform luminance, analyzes a state of the inspection target region based on each of the image information items of the image extracted using a learned model, and causes the learned model to perform further learning.

* * * * *